United States Patent
Sagmeister et al.

(10) Patent No.: US 9,454,373 B1
(45) Date of Patent: Sep. 27, 2016

(54) METHODS AND COMPUTER SYSTEMS OF SOFTWARE LEVEL SUPERSCALAR OUT-OF-ORDER PROCESSING

(71) Applicant: INTERNATIONAL BUSINESS MACHINES CORPORATION, Armonk, NY (US)

(72) Inventors: Patricia M. Sagmeister, Adliswil (CH); Martin L. Schmatz, Rueschlikon (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/964,605

(22) Filed: Dec. 10, 2015

(51) Int. Cl.
*G06F 9/30* (2006.01)
*G06F 9/48* (2006.01)
*G06F 9/38* (2006.01)

(52) U.S. Cl.
CPC ......... *G06F 9/30145* (2013.01); *G06F 9/3851* (2013.01); *G06F 9/485* (2013.01)

(58) Field of Classification Search
CPC ... G06F 9/30145; G06F 9/3851; G06F 9/485
See application file for complete search history.

(56) References Cited

U.S. PATENT DOCUMENTS

| | | | |
|---|---|---|---|
| 8,352,724 B2 | 1/2013 | Miyanaga | |
| 8,364,744 B2 | 1/2013 | Wittenschlaeger | |
| 8,595,736 B2 | 11/2013 | Barsness et al. | |
| 8,959,525 B2 | 2/2015 | Agarwal et al. | |
| 2010/0269102 A1* | 10/2010 | Latorre | G06F 9/3842 717/130 |
| 2012/0180058 A1 | 7/2012 | Barsness et al. | |
| 2013/0232471 A1 | 9/2013 | Henties et al. | |

OTHER PUBLICATIONS

Chan et al; Supermatrix out-of-order scheduling of matrix operations for SMP and multi-core architectures; SPAA 2007 Proceedings; pp. 116-125.

* cited by examiner

*Primary Examiner* — Benjamin Geib
(74) *Attorney, Agent, or Firm* — Cantor Colburn LLP; David Quinn

(57) ABSTRACT

Embodiments include methods, computer systems and computer program products for performing superscalar out-of-order processing in software in a computer system. Aspects include: loading opcodes into an analysis thread of the computer system, analyzing opcodes to identify certain non-independent opcode snippets, distributing non-independent opcode snippets to separate threads of computer system, instructing each of separate threads to execute each of non-independent opcode snippets, respectively, and collecting results of executions of each of separate threads by a consolidation thread. In exemplary embodiments, analyzing may include analyzing the opcodes using arbitrarily large variable size instruction windows to identify the non-independent opcode snippets, and distributing may include distributing opcode snippets: to a thread of same ISA, and to a code morphing thread when the opcode snippets need to be executed in threads of different ISA and then distributing the opcode snippets to the threads of different ISA by the code morphing thread.

17 Claims, 5 Drawing Sheets

METHODS AND COMPUTER SYSTEMS OF SOFTWARE LEVEL SUPERSCALAR OUT-OF-ORDER PROCESSING

BACKGROUND

The present disclosure relates generally to computer systems, and more particularly to methods and computer systems performing superscalar out-of-order processing.

Modern central processing units (CPU) have a superscalar out-of-order architecture. A superscalar CPU implements a form of instruction-level parallelism within a single processor. It allows faster CPU throughput and executes more instructions in a unit of time. A superscalar processor executes more than one instruction during a clock cycle by simultaneously dispatching multiple instructions to different execution units such as an arithmetic logic unit, a shifter, or a multiplier, on the processor. The superscalar aspect brings the benefit of 'workload optimization' (e.g. single instruction multiple data streams (SIMD) engine is good at vector processing). Out-of-order execution is a paradigm used in most high-performance microprocessors to make use of instruction cycles that would otherwise be wasted by a certain type of costly delay. A processor executes instructions in an order governed by the availability of input data, not necessarily in their original order in a program. In doing so, the processor can avoid being idle while waiting for the preceding instruction to complete and to retrieve data for the next instruction in a program, processing instead the next instructions which are able to run immediately and independently. It can be viewed as a hardware based dynamic recompilation to improve instruction scheduling. The out-of-order aspect brings high processing performance and the benefit of auto-parallelization of independent code segments.

However, the superscalar out-of-order processing architecture has its limitations. For example, there is only limited availability of processing units (e.g. two integer processing units, one float point unit (FPU), one single instruction stream, multiple data streams processing unit). Some of the processing units are hard-wired, (e.g. an integer processing unit can't be changed at runtime into a floating point processing unit as it is built with CMOS transistors). The size of out-of-order instruction window is finite and fixed.

Therefore, heretofore unaddressed needs still exist in the art to address the aforementioned deficiencies and inadequacies.

SUMMARY

In an embodiment of the present invention, a method of software level superscalar out-of-order processing in a computer system may include: loading operation codes (opcodes) into an analysis thread of a computer in the computer system having one or more computers connected through a network (i.e. SMB bus), analyzing, at the analysis thread, the opcodes to identify certain non-independent opcode snippets, distributing the identified non-independent opcode snippets to one or more separate threads of the computer system by the analysis thread, instructing each of the one or more separate threads to execute each of the distributed non-independent opcode snippets, respectively, and collecting the results of the executions of each of the one or more separate threads by a consolidation thread.

In another embodiment of the present invention, a computer system for performing software level superscalar out-of-order processing may include: one or more computers connected through a network, and a memory. Each of the computers may include one or more processors. Each of the processors may include one or more cores. Each of the one or more cores may include one or more threads. The memory stores computer executable instructions for performing superscalar out-of-order processing. When these computer executable instructions are executed at a processor of the computer system, these computer executable instructions are configured to: load opcodes into an analysis thread of the computer system, analyze, at the analysis thread, the opcodes to identify non-independent opcode snippets, distribute the identified non-independent opcode snippets to one or more separate threads by the analysis thread, instruct each of the one or more separate threads to execute each of the distributed non-independent opcode snippets, respectively, and collect the results of the executions of each of the one or more separate threads by a consolidation thread.

In yet another embodiment of the present invention, the present disclosure relates to a non-transitory computer storage medium. In certain embodiments, the non-transitory computer storage medium stores computer executable instructions. When these computer executable instructions are executed by a processor of a computer of a computer system, these instructions cause the processor to perform: loading opcodes into an analysis thread of the computer in the computer system, analyzing, at the analysis thread, the opcodes to identify certain non-independent opcode snippets, distributing the identified non-independent opcode snippets to one or more separate threads of the computer system by the analysis thread, instructing each of the one or more separate threads to execute each of the distributed non-independent opcode snippets, respectively, and collecting the results of the executions of each of the one or more separate threads by a consolidation thread.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
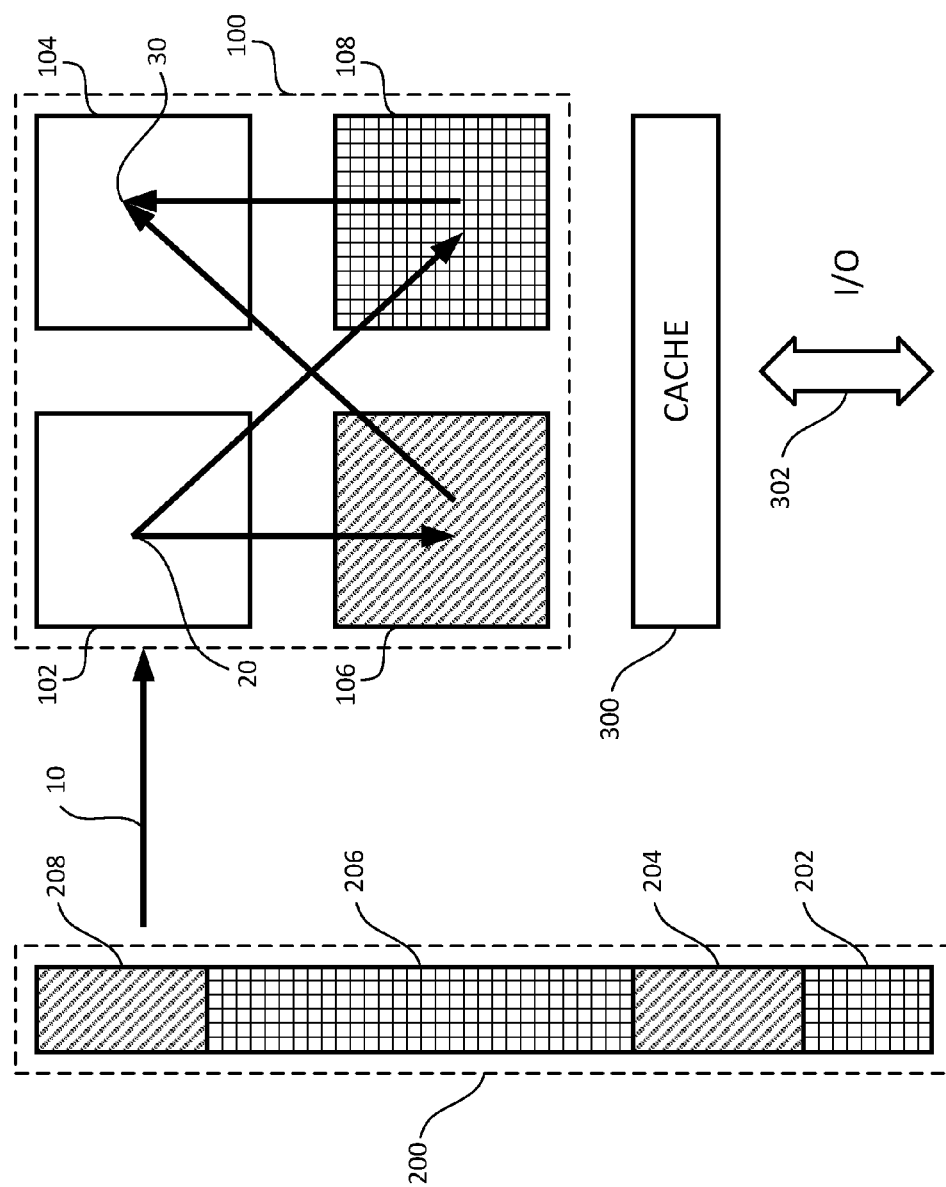
FIG. 1 is a graphical illustration of a method of superscalar out-of-order processing using a homogeneous four core CPU in accordance with exemplary embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

"SIMD" stands for single instruction stream, multiple data streams.

"ISA" stands for instruction set architecture.

"SMP" stands for symmetric multiprocessor.

"PCI" stands for peripheral component interconnect.

"opcode" is short form of operation code.

A processor may include multiple cores. Each of the cores may include one or more threads. For example, an INTEL® Core™ i-7 processor has 4 cores, and executes 8 separate threads. When a core can only execute one thread, then, the term "core" may be interchangeable with the term "thread".

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-5, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Due to the limitations of the superscalar out-of-order processing architecture, it is desirable to seek other solutions to improve the performance of modern CPUs. In one embodiment of the present invention, a computer system for performing software level superscalar out-of-order processing may include: one or more computers connected through a network, and at least one memory.

In certain embodiments, each of the computers may include one or more processors. As shown in FIG. 1, in one embodiment, the computer has one processor (or CPU) 100. The processor 100 has four homogeneous cores, 102, 104, 106, and 108. Each of the cores may include one or more threads. In another embodiment, the computer has a processor 100. The processor 100 has four homogeneous threads, 102, 104, 106, and 108. The size of these homogeneous cores may be the same, and they may have same type of instruction set architecture (ISA). The processor 100 may include a cache 300, and one or more input/output (I/O) ports 302.

Figure 2:
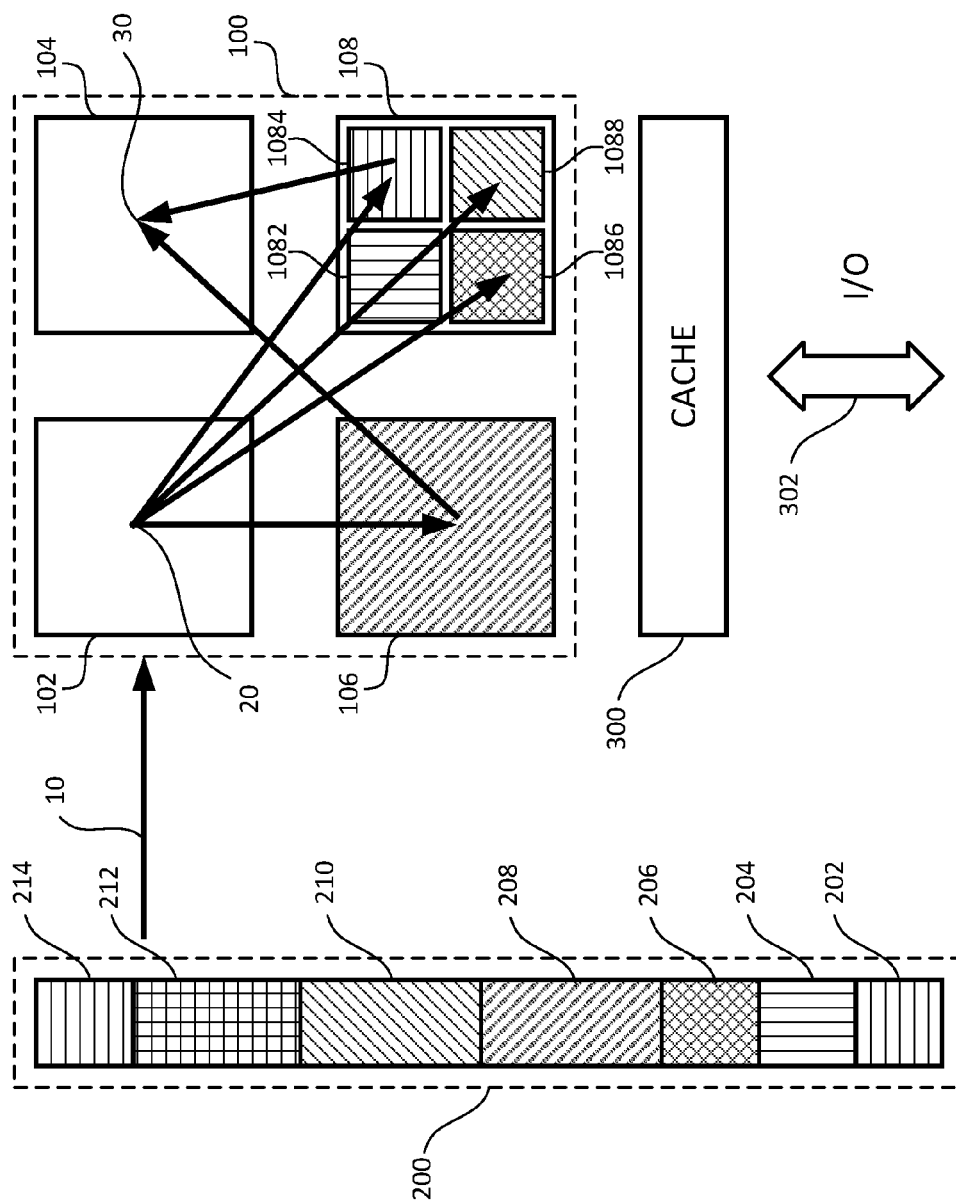
FIG. 2 is a graphical illustration of a method of superscalar out-of-order processing using a heterogeneous four core CPU in accordance with exemplary embodiments of the present disclosure.

In another embodiment as shown in FIG. 2, the computer has a processor 100. The processor 100 has four heterogeneous cores, 102, 104, 106, and 108. The size of these heterogeneous cores may be different. For example, there are three large cores 102, 104, and 106, and the core 108 has four small cores 1082, 1084, 1086, and 1088. The processor 100 may have configurations of other combinations of large cores and small cores. Each of the cores may include one or more threads. In certain embodiments, they may have the same type of ISA. In other embodiments, different cores may have different types of ISA. The processor 100 may also include a cache 300, and one or more I/O ports 302.

Figure 3:
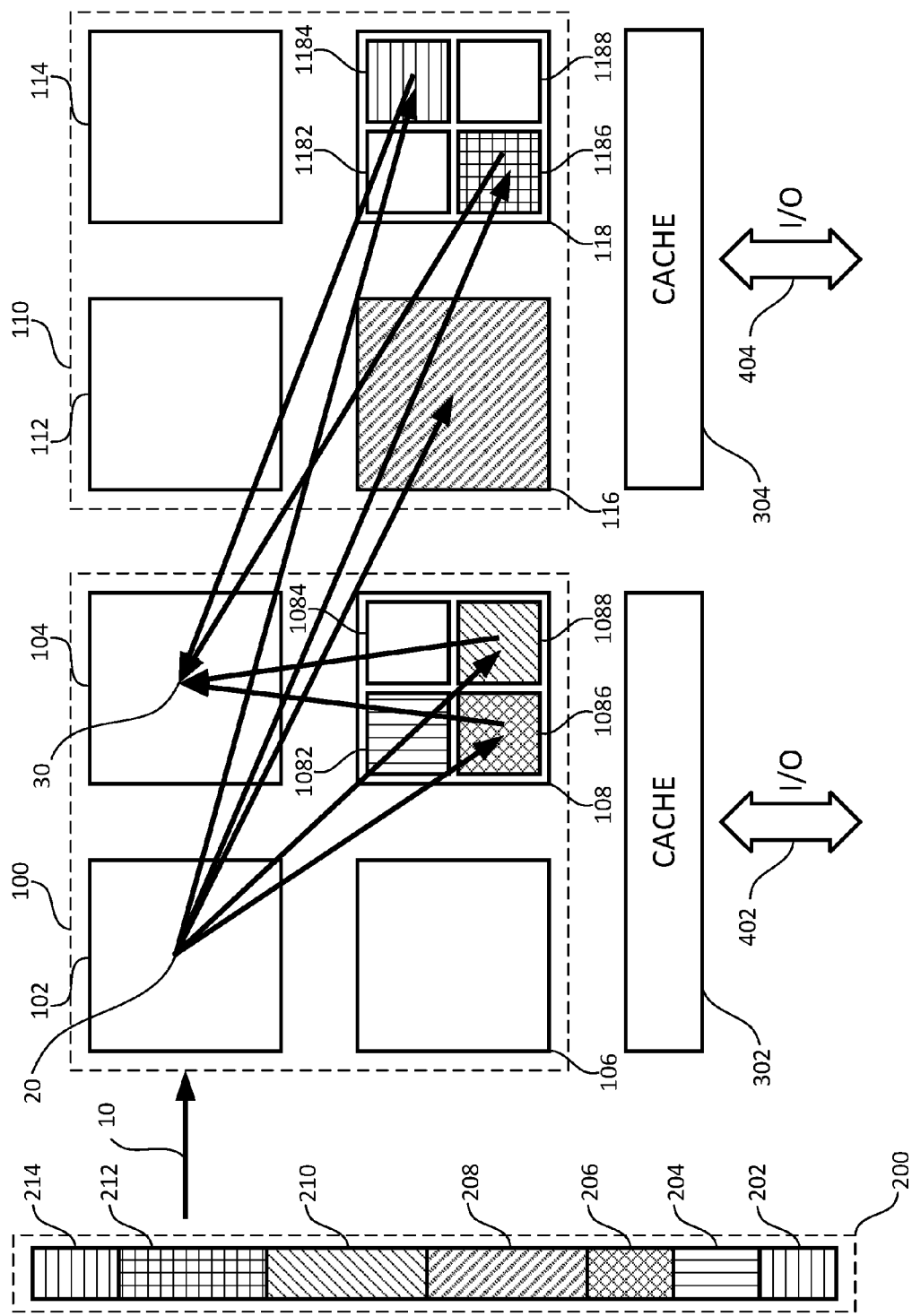
FIG. 3 is a graphical illustration of a method of superscalar out-of-order processing using two heterogeneous four core CPUs with the same instruction set architecture (ISA) in accordance with exemplary embodiments of the present disclosure.

In yet another embodiment as shown in FIG. 3, the computer has two processors 100 and 110. The processor 100 has four heterogeneous cores, 102, 104, 106, and 108, and the processor 110 has four heterogeneous cores, 112, 114, 116, and 118. The size of these heterogeneous cores may be different. For example, there are three large cores 102, 104, and 106, and the core 108 has four small cores 1082, 1084, 1086, and 1088 on the processor 100, and there are three large cores 112, 114, and 116, and the core 118 has four small cores 1182, 1184, 1186, and 1188 on the processor 110. Each of the cores may include one or more threads. In certain embodiments, they may have the same type of ISA. In other embodiments, different cores may have different types of ISA. The processor 100 may include a cache 302 and one or more I/O ports 402. The processor 110 may include a cache 304 and one or more I/O ports 404. The processors 110 and 110 are electronically coupled with each other via a network. In certain embodiments, the network may include symmetric multiprocessing (SMP) bus, a Peripheral Component Interconnect (PCI) bus, a local area network (LAN), wide area network (WAN), telecommunication network, wireless communication network, and the Internet.

Figure 4:
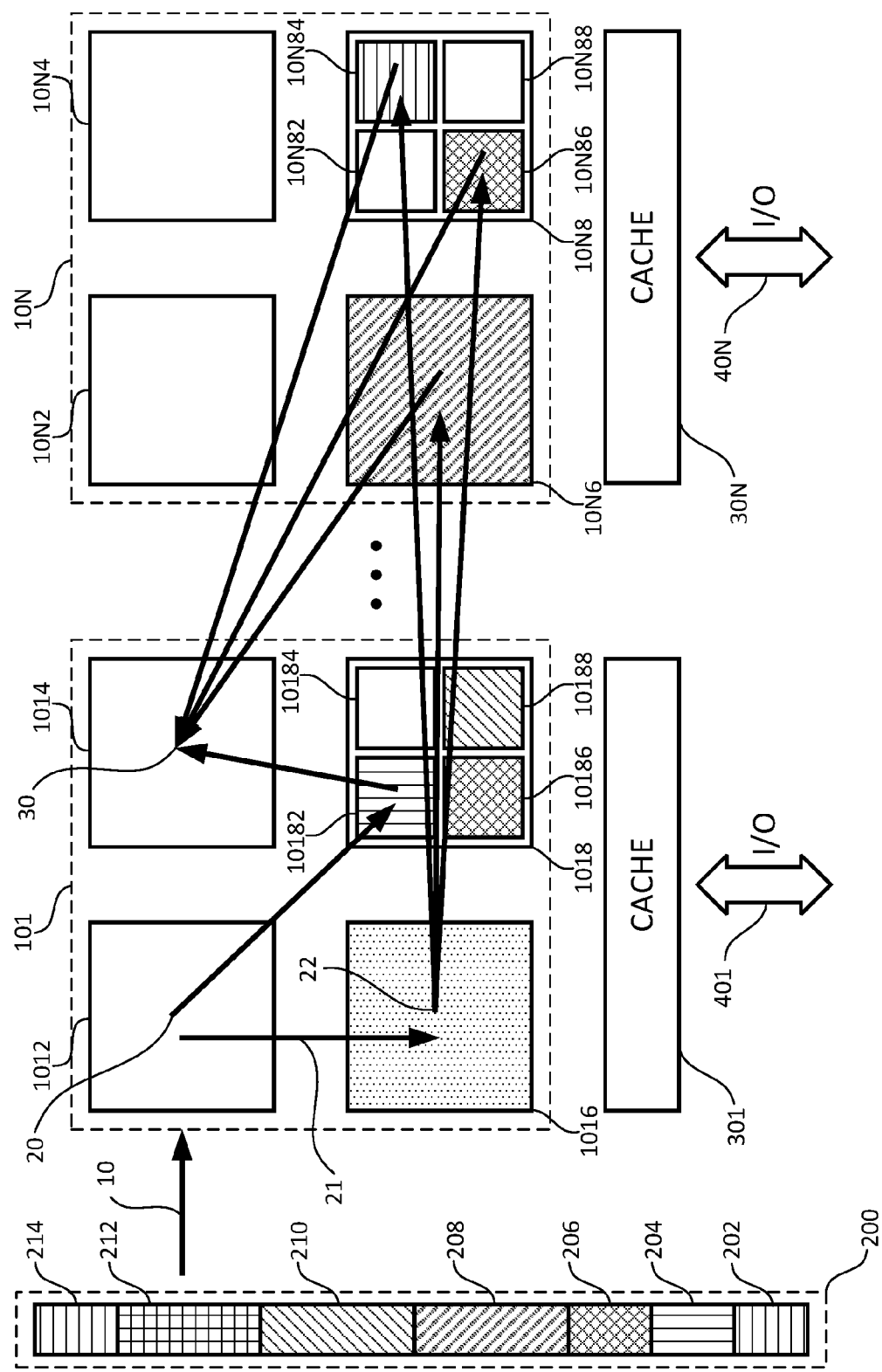
FIG. 4 is a graphical illustration of a method of superscalar out-of-order processing using N heterogeneous four core CPUs with different ISAs in accordance with exemplary embodiments of the present disclosure.
Figure 5:
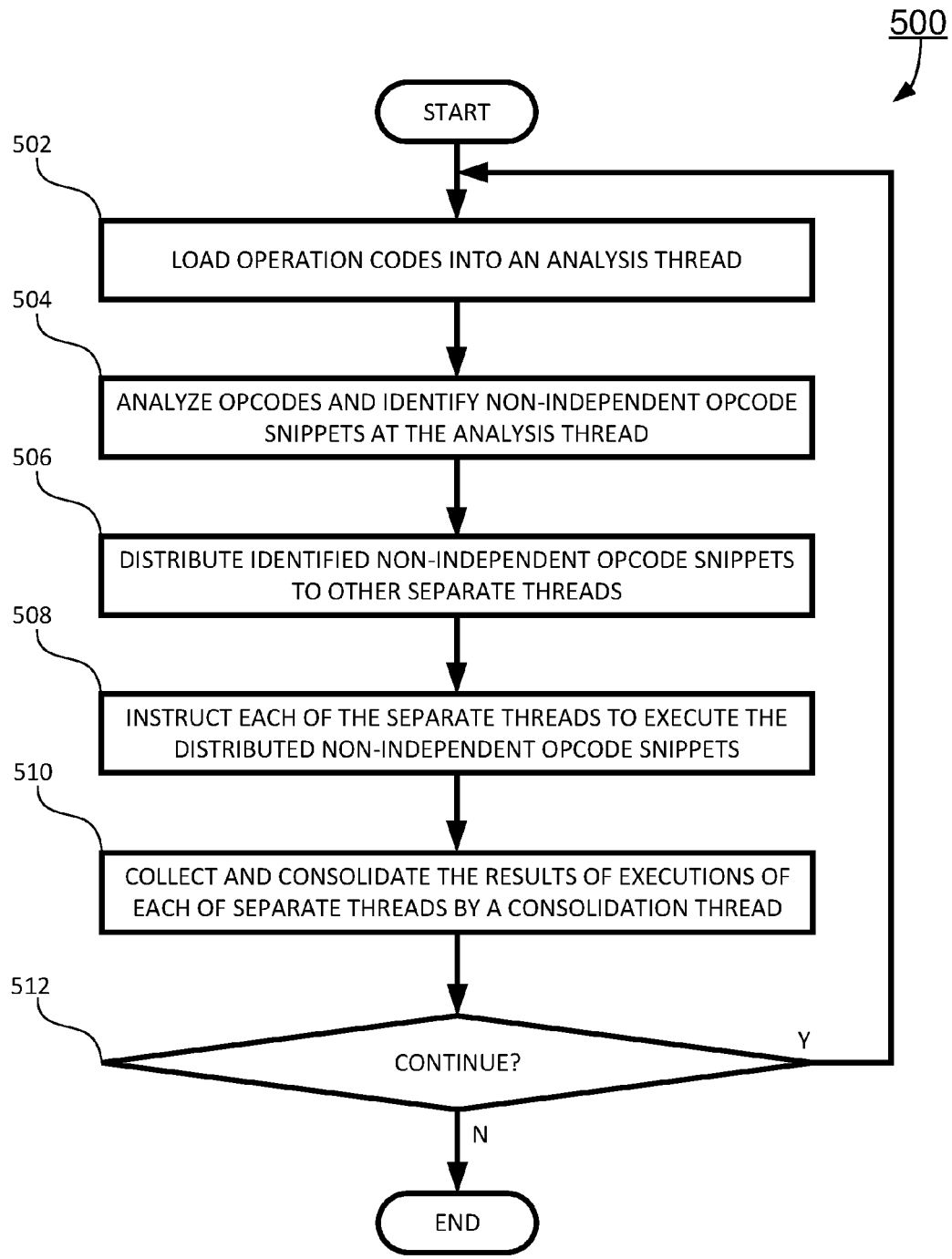
FIG. 5 is a flow chart of an exemplary method of software level superscalar out-of-order processing according to certain exemplary embodiments of the present disclosure.

In a further embodiment as shown in FIG. 4, the computer has N heterogeneous four core processors, 101, 102, . . . , and 10N. Certain cores in such processors may include big cores such as 1012, 1014, and 1016 of the processor 101, and 10N2, 10N4, and 10N6 of the n-th processor 10N. Certain cores may include small cores such as 10182, 10184, 10186, and 10188 of the core 1018, and 10N82, 10N84, 10N86, and 10N88 of the core 10N8. In one embodiment, the processor 101 may have a first type of ISA, while the processor 10N may have a different, second type of ISA. Each of the processors 101, 102, . . . , and 10N has a corresponding cache 301, 302, . . . , and 30N, and a corresponding I/O ports 401, 402, . . . , and 40N. Each of the processors 101, 102, . . . , and 10N are electrically coupled to other processors through a network. In certain embodiments, the network may include one or more SMP buses, one or more PCI buses, an LAN, WAN, telecommunication network, wireless communication network, and the Internet.

An exemplary method of software level superscalar out-of-order processing will now be described more fully with reference to the accompanying drawings FIGS. 1-5, in which certain exemplary embodiments of the present disclosure are shown.

As shown at block 502, a processor 100 loads opcodes 200 into an analysis thread 102 of a computer in a computer system as shown as operation 10 in FIGS. 1-4. Here the analysis thread 102 can also be an individual core 102. The computer system may include one or more computers connected through a network or bus. The opcodes 200 may include many non-independent opcode snippets 202, 204, 206, and 208 in FIG. 1, and 202, 204, 206, 208, 210, 212, and 214 in FIGS. 2, 3, and 4. In certain embodiments, the network may include one or more SMP buses, one or more PCI buses, an LAN, WAN, telecommunication network, wireless communication network, and the Internet.

At block 504, the processor 100 analyzes the opcodes in the analysis thread 102 or the analysis core 102, and identifies certain non-independent opcode snippets 202, 204, 206, and 208 as shown in FIG. 1, and 202, 204, 206, 208, 210, 212, and 214 as shown in FIGS. 2, 3, and 4. These non-independent opcode snippets may be executed in different threads. In certain embodiments, the processor 100 analyzes the opcodes using arbitrarily large and variable size instruction windows to identify the non-independent opcode snippets so that opcode snippets are identified without fixed and finite windows size.

At block 506, the processor 100 distributes the identified non-independent opcode snippets to one or more separate threads of the computer system by the analysis thread. In one embodiment, these separate threads of the computer system can be in the same core of the processor. In another embodiment, these separate threads of the computer system can be in the different cores of the same processor. In yet another embodiment, these separate threads of the computer system can be in the different processors. In yet a further embodiments, these separate threads of the computer system can be in the different cores of different processors of different computers connected through the network or buses.

For example, in one embodiment as shown in FIG. 1, the analysis thread 102 distributes the identified non-independent opcode snippets 202 and 206 to the thread or core 108 of the processor 100, and 204 and 208 to the thread 106 or core 106, as shown as operation 20 in FIG. 1.

In other exemplary embodiments, the distributing may include distributing the identified non-independent opcode snippets to different kind of threads to achieve optimum fit of the opcode snippets requirements and available computer resources. In another embodiment as shown in FIG. 2, the analysis thread 102 distributes the identified non-independent opcode snippet 202 to a small core 1084 of the core 108 of the processor 100, 206 to a small core 1086 of the core 108 of the processor 100, 208 to the core 106 of the processor 100, and 210 to a small core 1088 of the core 108 of the processor 100, as shown as operation 20 in FIG. 2.

Assuming the processors 100 and 110 have the same ISA, in yet another embodiment as shown in FIG. 3, the analysis thread 102 distributes the identified non-independent opcode snippets 206 to a small core 1086, and 210 to a small core 1088 of the core 108 of the processor 100, 208 to a large core 116 of the processor 110, 212 to a thread 1186 of the core 118 of the processor 110, and 214 to a thread 1184 of the core 118 of the processor 110, as shown as operation 20 in FIG. 3.

In certain embodiments, the processors may distribute the identified non-independent opcode snippets to threads of the same core, of the same processor, of different processors, and of the different computers of the computer system over the network or buses.

In a further embodiment as shown in FIG. 4, the first processor 101 may have a first type of ISA, and the N-th processor 10N may have a different, second type of ISA. Direct distributions of identified non-independent snippets in one ISA to the threads of these processors are not allowed. Therefore, when the threads receiving the opcode snippets have a different ISA than the opcode snippets to be distributed, the first processor 101 may distribute these opcode snippets to a code morphing thread 1016 or code morphing core 1016 of the processor 101, the code morphing thread 1016 or the code morphing core 1016 morphs the opcode snippets in the first ISA to opcode snippets in the second ISA, and then distributes the morphed opcode snippets to the threads in of different processor having the second ISA. Therefore, the analysis thread 1012 directly distributes the opcode snippet 204 to a small core 10182 of the core 1018 of the processor 101 as shown as operation 20 in FIG. 4, and distributes the opcode snippets 206, 208, and 214 to the code morphing thread 1016 as shown as operation 21, and then the code morphing thread 1016 morphs the opcode snippets 206, 208, and 214 to the second ISA, and distributes the opcode snippets 206 to a small core 10N86 of the core 10N8 of the processor 10N, 208 to a large core 10N6 of the core 10N of the processor 10N, and 214 to a small core 10N84 of the core 10N8 of the processor 10N as shown as operation 22.

At block 508, the processor instructs the threads that received opcode snippets distributions to execute the opcode snippets received, and to send the execution results to a consolidation thread or consolidation core. For example, in the embodiment in FIG. 3, the processor 100 instructs: the thread 1086 of the core 108 of the processor 100 to execute the opcode snippets 206, and to send the execution results of the opcode snippets 206 to a consolidation thread 104, the thread 1186 of the core 118 of the processor 110 to execute the opcode snippets 212, and to send the execution results of the opcode snippets 212 to the consolidation thread 104.

At block 510, the processor collects and consolidates the results of various separate executions over each of the one or more separate threads by the consolidation thread as shown as operations 30 in FIGS. 1-4. For example, in the embodiment in FIG. 1, the execution results of the opcode snippets 204 and 208 at the thread 106 of the processor 100, and the execution results of the opcode snippets 202 and 206 at the thread 108 of the processor 100 are collected by the consolidation thread 104. In the embodiment in FIG. 2, the execution results of the opcode snippets 208 at the thread 106 of the processor 100 and the execution results of the opcode snippets 214 at the thread 1084 of the processor 100 are collected by the consolidation thread 104 of the processor 100.

The method described above implements an equivalent of superscalar out-of-order processing CPU architecture in software. The method uses an arbitrarily large and variable sized instruction windows to identify code sections, which is the equivalent of out-of-order issuing in a CPU, but with arbitrarily large and variable instruction windows, assigns certain opcode snippets to a core or thread which has good performance characteristics for those opcode snippets, which is the equivalent of super-scalar processing in a CPU, and has a core or a thread that collects and consolidates the execution results of each of the opcode snippets and puts them back in order, which is equivalent to register writeback in a CPU. All these superscalar out-of-order processing features are implemented in software without any hardware modifications.

In yet another embodiment of the present invention, the present disclosure relates to a non-transitory computer storage medium. In certain embodiments, the non-transitory computer storage medium stores computer executable instructions. When these computer executable instructions are executed by a processor of a computer system, these instructions cause the processor to perform: loading opcodes into an analysis thread of a computer in the computer system having one or more computers connected through a network, analyzing, at the analysis thread, the opcodes to identify certain non-independent opcode snippets, distributing the identified non-independent opcode snippets to one or more separate threads of the computer system by the analysis thread, instructing each of the one or more separate threads to execute each of the distributed non-independent opcode snippets, respectively, and collecting the results of the executions of each of the one or more separate threads by a consolidation thread.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of performing superscalar out-of-order processing in software on a computer system comprising:
    loading a plurality of operation codes (opcodes) into an analysis thread of a core of a processor of a computer of the computer system, wherein the computer system comprises a plurality of computers connected through a network and bus;
    analyzing, at the analysis thread, the plurality of opcodes to identify a plurality of non-independent opcode snippets;
    distributing the plurality of identified non-independent opcode snippets to one or more separate threads by the analysis thread, wherein the distributing comprises:
        distributing the plurality of identified non-independent opcode snippets to a thread of the same instruction set architecture (ISA); and
        distributing the plurality of identified non-independent opcode snippets to a code morphing thread when the plurality of identified non-independent opcode snippets needs to be executed in threads of different ISA, and distributing the plurality of identified non-independent opcode snippets to the threads of different ISA by the code morphing thread;
    instructing each of the one or more separate threads to execute each of the plurality of distributed non-independent opcode snippets, respectively; and
    collecting the results of the executions of each of the one or more separate threads by a consolidation thread.

2. The method of claim 1, wherein the analyzing comprises:
    analyzing the plurality of opcodes using variable size instruction windows to identify the plurality of non-independent opcode snippets; and
    analyzing the plurality of opcodes using arbitrarily large instruction windows to identify the plurality of non-independent opcode snippets.

3. The method of claim 1, wherein each of the one or more computers comprises one or more processors, each of the one or more processors comprises one or more cores, and each of the one or more cores comprises one or more threads.

4. The method of claim 1, wherein the network comprises one or more symmetric multiprocessing (SMP) buses, one or more Peripheral Component Interconnect (PCI) buses, a local area network (LAN), a wide area network (WAN), telecommunication network, wireless communication network, and the Internet.

5. The method of claim 1, wherein the distributing comprises:
    distributing the plurality of identified non-independent opcode snippets to different kind of threads to achieve optimum fit of the opcode snippets requirements and available computer resources.

6. The method of claim 1, wherein the distributing comprises:
    distributing the plurality of identified non-independent opcode snippets to threads of the same processor; and
    distributing the plurality of identified non-independent opcode snippets to threads of the one or more processors of other computers in the computer system over the network.

7. A computer system comprising:
    a plurality of computers connected through a network, wherein each of the one or more computers comprises one or more processors, each of the one or more processors comprises one or more cores, and each of the one or more cores comprises one or more threads; and
    a memory storing computer executable instructions for performing superscalar out-of-order processing, which, when executed at a processor of the computer system, are configured to:
        load a plurality of opcodes into an analysis thread of the computer system;
        analyze, at the analysis thread, the plurality of opcodes to identify a plurality of non-independent opcode snippets;
        distribute the plurality of identified non-independent opcode snippets to one or more separate threads by the analysis thread, wherein the computer executable instructions are further configured to:

distribute the plurality of identified non-independent opcode snippets to a thread of the same instruction set architecture (ISA); and distribute the plurality of identified non-independent opcode snippets to a code morphing thread when the plurality of identified non-independent opcode snippets needs to be executed in threads of different ISA, and distributing the plurality of identified non-independent opcode snippets to the threads of different ISA by the code morphing thread;

instruct each of the one or more separate threads to execute each of the plurality of distributed non-independent opcode snippets, respectively; and collect the results of the executions of each of the one or more separate threads by a consolidation thread.

8. The computer system of claim 7, wherein the computer executable instructions is configured to:

analyze the plurality of opcodes using arbitrarily large instruction windows to identify the plurality of non-independent opcode snippets; and analyze the plurality of opcodes using variable size instruction windows to identify the plurality of non-independent opcode snippets.

9. The computer system of claim 7, wherein the network comprises one or more symmetric multiprocessing (SMP) buses, one or more Peripheral Component Interconnect (PCI) buses, a local area network (LAN), a wide area network (WAN), telecommunication network, wireless communication network, and the Internet.

10. The computer system of claim 7, wherein the computer executable instructions is configured to distribute the plurality of identified non-independent opcode snippets to different kind of threads to achieve optimum fit of the opcode snippets requirements and available computer resources.

11. The computer system of claim 7, wherein the computer executable instructions is configured to distribute the plurality of identified non-independent opcode snippets to threads of the same processor; and distribute the plurality of identified non-independent opcode snippets to threads of the plurality of processors of other computers in the computer system over the network.

12. A non-transitory computer storage medium having computer executable instructions stored thereon which, when executed by a processor of a computer system, cause the processor to perform:

loading a plurality of opcodes into an analysis thread of the processor of the computer of the computer system, wherein the computer system comprises a plurality of computers connected through a network;

analyzing, at the analysis thread, the plurality of opcodes to identify a plurality of non-independent opcode snippets;

distributing the plurality of identified non-independent opcode snippets to one or more separate threads by the analysis thread, wherein the distributing comprises:

distributing the plurality of identified non-independent opcode snippets to a thread of the same ISA; and distributing the plurality of identified non-independent opcode snippets to a code morphing thread when the plurality of identified non-independent opcode snippets needs to be executed in threads of different ISA, and distributing the plurality of identified non-independent opcode snippets to the threads of different ISA by the code morphing thread;

instructing each of the one or more separate threads to execute each of the plurality of distributed non-independent opcode snippets, respectively; and collecting the results of the executions of each of the one or more separate threads by a consolidation thread.

13. The non-transitory computer storage medium of claim 12, wherein the analyzing comprises:

analyzing the plurality of opcodes using arbitrarily large instruction windows to identify the plurality of non-independent opcode snippets; and analyzing the plurality of opcodes using variable size instruction windows to identify the plurality of non-independent opcode snippets.

14. The non-transitory computer storage medium of claim 12, wherein the network comprises one or more symmetric multiprocessing (SMP) buses, one or more Peripheral Component Interconnect (PCI) buses, a local area network (LAN), a wide area network (WAN), telecommunication network, wireless communication network, and the Internet.

15. The non-transitory computer storage medium of claim 12, wherein the computer system comprises one or more computers, each of the one or more computers comprises one or more processors, each of the one or more processors comprises one or more cores, and each of the one or more cores comprises one or more threads.

16. The non-transitory computer storage medium of claim 12, wherein the distributing comprises distributing the plurality of identified non-independent opcode snippets to different kind of threads to achieve optimum fit of the opcode snippets requirements and available computer resources.

17. The non-transitory computer storage medium of claim 12, wherein the distributing comprises:

distributing the plurality of identified non-independent opcode snippets to threads of the same processor;

distributing the plurality of identified non-independent opcode snippets to threads of the plurality of processors of other computers in the computer system over the network, distributing the plurality of identified non-independent opcode snippets to cores of the same processor; and distributing the plurality of identified non-independent opcode snippets to cores of the plurality of processors of other computers in the computer system over the network.

* * * * *